(12) United States Patent
Corbey, Jr.

(10) Patent No.: US 11,813,220 B1
(45) Date of Patent: Nov. 14, 2023

(54) STAND

(71) Applicant: Robert J. Corbey, Jr., Selbyville, DE (US)

(72) Inventor: Robert J. Corbey, Jr., Selbyville, DE (US)

( * ) Notice: Subject to any disclaimer, the term of this patent is extended or adjusted under 35 U.S.C. 154(b) by 0 days.

(21) Appl. No.: 17/352,171

(22) Filed: Jun. 18, 2021

(51) Int. Cl.
*A61H 19/00* (2006.01)
*F16M 11/04* (2006.01)

(52) U.S. Cl.
CPC ........... *A61H 19/00* (2013.01); *F16M 11/046* (2013.01); *A61H 2201/0119* (2013.01)

(58) Field of Classification Search
CPC .......................... A61H 19/00–50; A61H 21/00
See application file for complete search history.

(56) References Cited

U.S. PATENT DOCUMENTS

| | | |
|---|---|---|
| 3,553,746 A | 1/1971 | Seiger |
| 4,550,907 A | 11/1985 | Melillo et al. |
| 5,305,773 A | 4/1994 | Browing |
| 6,179,795 B1 * | 1/2001 | Garza ................... A61H 19/30 600/38 |
| 6,244,285 B1 | 1/2001 | Gamache |
| 7,056,281 B2 | 6/2006 | Bookwalter et al. |
| 9,782,317 B2 | 10/2017 | Mount |
| 2005/0215852 A1 * | 9/2005 | Hatami ................. A61H 19/44 600/38 |
| 2006/0004251 A1 * | 1/2006 | Bookwaiter .......... A61H 19/44 600/38 |
| 2011/0190575 A1 * | 8/2011 | McGough ............. A61H 19/30 600/38 |
| 2015/0150752 A1 * | 6/2015 | Bernstein .............. A61H 19/44 600/38 |
| 2018/0104088 A1 * | 4/2018 | Ishikawa ............... A61H 21/00 |
| 2019/0282439 A1 * | 9/2019 | Ray ....................... A61H 19/44 |
| 2020/0329879 A1 * | 10/2020 | Brichet ................ A47C 15/008 |

FOREIGN PATENT DOCUMENTS

WO WO-2015067836 A1 * 5/2015 ............. A61H 19/32

* cited by examiner

*Primary Examiner* — Thaddeus B Cox
(74) *Attorney, Agent, or Firm* — The Merek Group, Inc; Joseph C. Merek

(57) ABSTRACT

A stand for holding and securely supporting an erotic device thereon. The stand having at least one vertical support member supported by a base. The stand may employ a second vertical support spaced laterally from a first vertical support.

11 Claims, 6 Drawing Sheets

STAND

FIELD OF THE DISCLOSURE

The present disclosure relates generally to a stand for supporting a device. The device may be an erotic device or other devices as desired by the user. The stand will preferably interface with a bed for enhanced stability. The erotic device will removably mounted to the stand so that it may be changed out or removed rapidly. The stand may include a drive mechanism for propelling the erotic device in a reciprocating manner.

It is envisioned that the stand may be used to hold other devices or elements secured thereon or thereto.

SUMMARY

The primary object of the present disclosure is directed to a stand for securely holding an erotic device thereon or thereto.

A further object of the present disclosure is to provide a stand that can interface or engage with a bed to make the stand more stable.

A further object of the present disclosure is to provide a base member for holding the stand in an upright manner.

A further object of the present disclosure is to provide a support member for engaging a mattress or other supporting element to provide additional support and stability to the stand.

A further object of the present disclosure is to provide the stand with a driving mechanism to provide reciprocating motion or movement to the erotic device.

Figure 1:
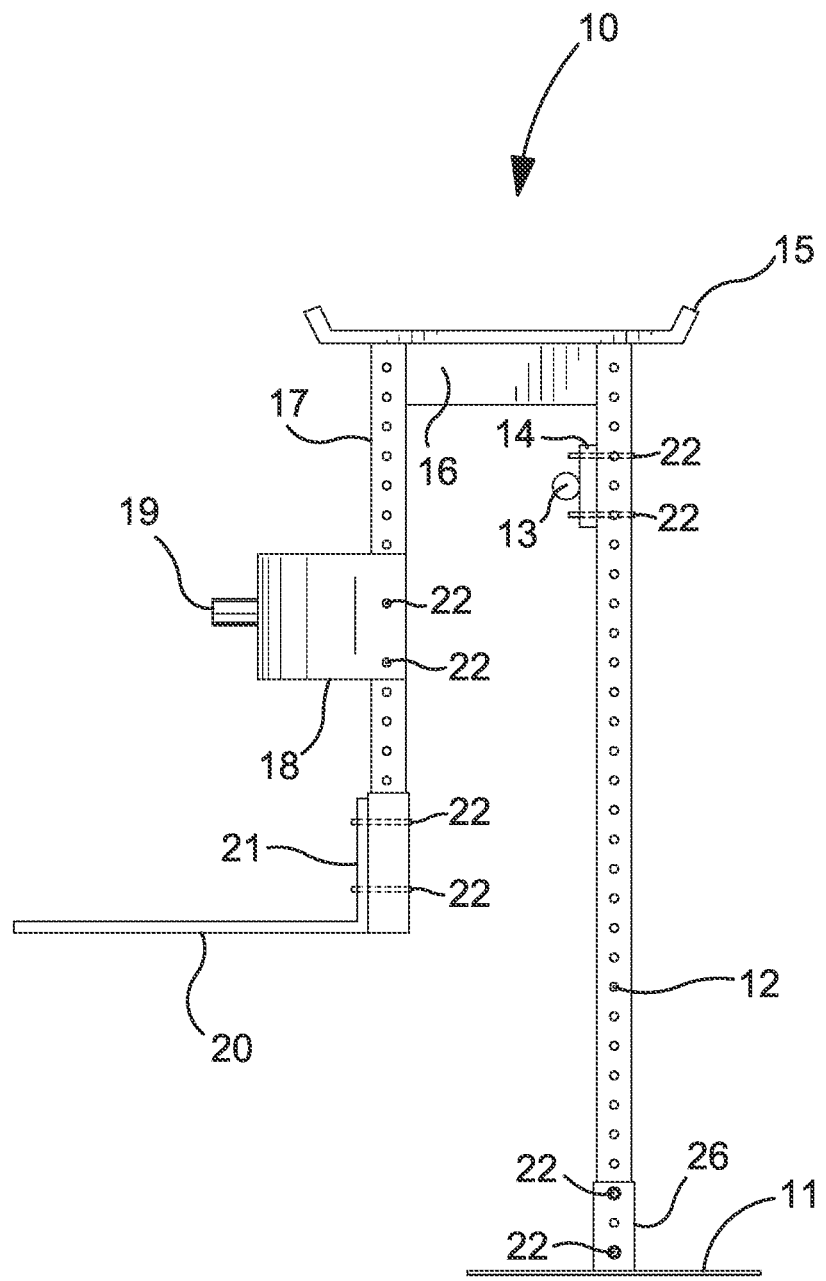
FIG. 1 is a side view of the stand.

These and other features of the present embodiments will be better understood by reading the detailed description, taken together with the Figures herein described. For purposes of clarity, not every component may be labeled in every drawing. Furthermore, as will be appreciated, the Figures are not necessarily drawn to scale or intended to limit the present disclosure to the specific configurations shown. In short, the Figures are provided merely to show example structures.

DESCRIPTION OF THE REFERENCE NUMERALS

With regard to the reference numerals used, the following numbering is used throughout the various Figures.

10 Stand
11 Base
12 First Post
13 Rest
14 Brace
15 Tray
16 Connector
17 Second Post
18 Housing
19 Mount
20 Support Member
21 Upright Face
22 First Fastener
23 Coupler
24 Stop
25 Second Fastener
26 Post Holder
27 Fork
28 Fork Brace
29 Quick Release Fastener
30 Drive Mechanism
31 Drive Shaft

DETAILED DESCRIPTION

The present invention is directed to a stand that can hold an erotic device thereon. The stand is configured to provide a stable and innocuous way to hold an erotic device so the stand need not be hidden from sight. The stand hides in plain sight by resembling exercise equipment. The housing functions essentially as a screen or enclosure for the drive mechanism so that it is not readily visible.

Figure 2:
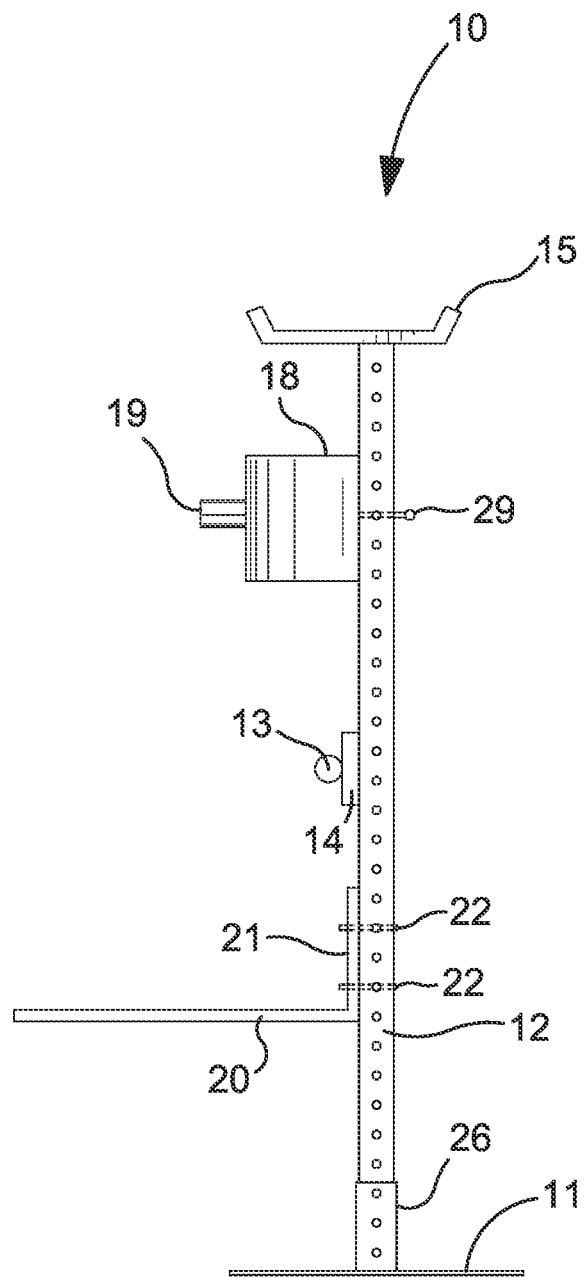
FIG. 2 is a side view of another embodiment of the stand.
Figure 5:
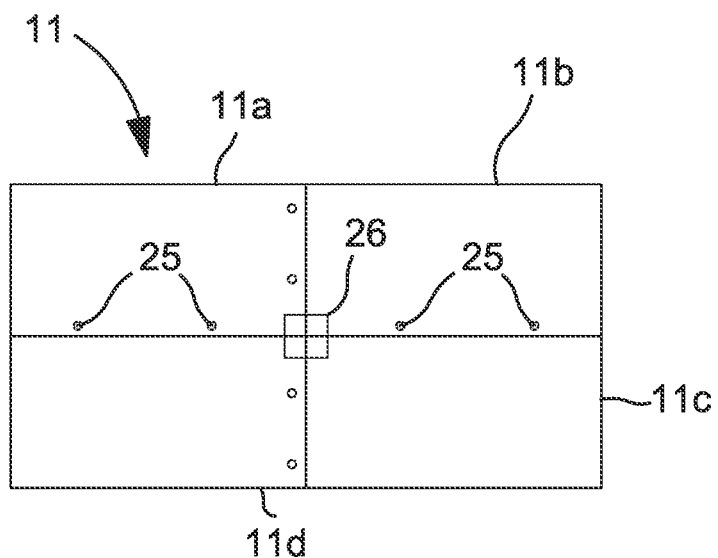
FIG. 5 is a top view of the base and the post holder.
Figure 6:
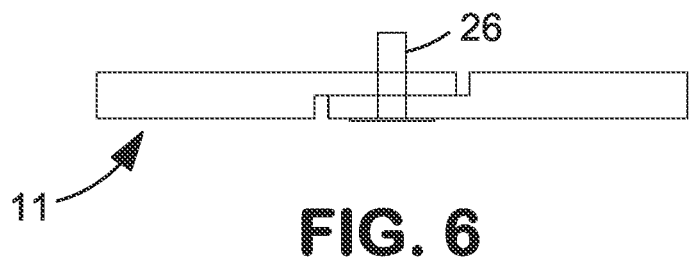
FIG. 6 is a side view of the base and the post holder.

FIGS. 1 and 2 illustrate the stand of the present invention which is indicated generally by 10. Stand 10 may be used to support an erotic device (not shown) in a secure and stable manner. Mount 19 secures the erotic device to the stand in a manner enabling the user to quickly remove the device from mount 19. It is envisioned that the mount 19 can be a threaded male member which is received in a complementary female threaded member of the erotic device. It is also envisioned that mount 19 not be limited to a threaded member. Mount 19 may include but is not limited to clamps, clamping members, or other such elements that are capable of readily, removably, and securely holding an erotic device to stand 10. Stand 10 includes base 11 which functions to hold stand 10 in an upright manner on a generally planar surface such as the floor on which stand 10 rests or sits. Base 10 is shown as a planar or plate like member, although it envisioned that base 10 can take other forms such as but not limited to separate members secured together to create an open web platform; legs secured together; and legs secured to a central member where the central member holds post 12,17 therein. FIGS. 5 and 6 show base 11 which is made up of four parts or elements 11a, 11b, 11c, and 11d. These four elements are held together by fasteners 25. These four elements overlap each other as shown in FIG. 6 allowing them to be secured together by second fasteners 25 seen in FIG. 5. Each joint between the base elements (11a,b,c,d) will employ at least one second fastener 25. This will enable stand 10 to be packed into a smaller box to reduce shipping costs or to reduce storage space. Preferably, second fasteners 25 will be removable fasteners such as screws or bolts to enable the user to readily assemble or disassemble base 11.

Base 11 may employ leveling members in the event it is placed on a floor or surface that is not level. These may be threaded feet or other such devices. As seen in FIG. 1, base 11 is connected to first post 12 via post holder 26 and first fasteners 22. This provides a reinforced connection between post 12 and base 11. Post holder 26 is provided with holes or openings which will align with the holes or openings in post 12 to accept first fasteners 22 therethrough. First fasteners 22 are removable fasteners such as threaded nuts and bolts to allow the user to quickly assemble the stand. First and second fasteners 22, 25 will preferably employ a hex wrench, a box wrench, or other inexpensive tool that is packaged with stand 10 to allow the use to readily tighten or remove first and second fasteners 22, 25. Post holder 26 may be secured to base 11 by fasteners that second fasteners 25. Preferably, the fasteners securing post holder 26 to base 11 will be flush with at least the bottom surface of base 11. It also may be desirable for the fasteners securing the post holder 26 to base 11 to be flush with the top surface of base 11. This will provide base 11 with a smooth surface for a user to place their foot.

The bottom surface of base 11 is provided with a recess thereon to accept post holder 26 therein. The recess allows post holder 26 to be substantially flush or flush with the bottom surface of base 11. Thus, base 11 will have a planar or substantially planar bottom surface. Preferably post 12 is removable to allow for stand 10 to be packed into a smaller package or smaller space thus reducing the cost of shipping and/or storage space.

Figure 4:
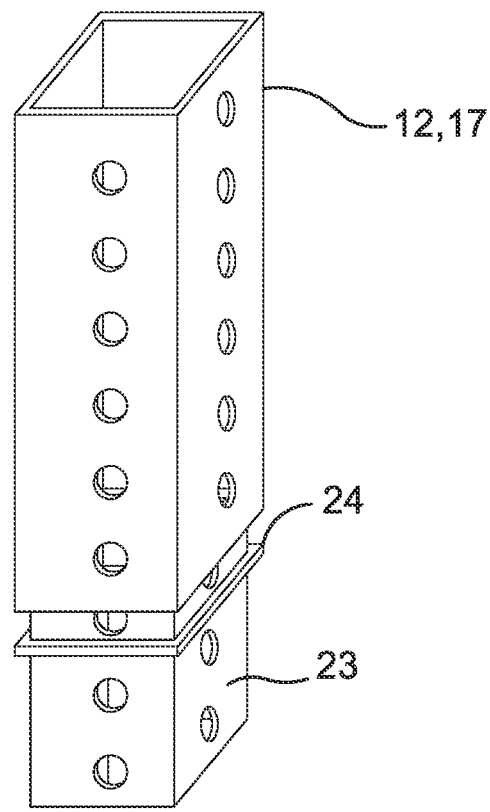
FIG. 4 is a side view of the coupler engaging the post.

First post 12 may include brace 14 for securing a rest 13 thereon. The rest 13 will provide a place for the user to rest their appendages or parts of their body thereon. It is envisioned that the rest 13 may support the legs of the user or parts thereof; arms or parts thereof; or any other parts as desired by the user. Preferably, rest 13 is padded or provided with a soft or elastic coating to make it more comfortable for the user to rest an appendage thereon. Rest 13 may be secured directly to post 12. Posts 12,17 can be made of a single piece or a plurality of pieces or sections. These sections will be capable of secured together in an interlocking manner so they do not come apart. FIG. 4 shows post 12,17 receiving a coupler 23. Coupler 23 is shown as fitting inside of post 12,17 and is then secured in place by removable fasteners inserted into the openings. Stop 24 provides proper alignment between the openings in post 12,17 and the openings in coupler 23 allowing removable fasteners to be inserted therethrough. It is envisioned that the removable fasteners can be threaded bolts and the openings in coupler 23 can be threaded to receive the threaded bolts therein. The reduced length of each post section allows for smaller packaging of stand 10 and reduced shipping costs.

As seen in FIG. 2, housing 18 and the support member 20 can be secured to directly to the first post 12. This eliminates the need for the second post 17 reducing the cost and the bulk of the packaged stand. Members 18 and 20 will preferably be removably secured to first post 12 whereby the user can place them at various locations along the height of first post 12. Mount 19 is attached to drive shaft 31 to provide motion to an erotic device secured to mount 19. Preferably, mount 19 is removably attached to drive shaft 31 enabling the user employ a different type of mount thereon. Mount 19 may be a threaded rod or any other type of mount that is capable of supporting an erotic device thereon. Stand 10 may also include a tray 15 for holding a variety of items thereon. Tray 15 may be permanently or removably secured to the upper end of first post 12. It is further envisioned that a supporting element may be secured between tray 15 and first post 12 to provide a stable and secure connection therebetween. These connections will be preferably be removable employing bolts or other common fasteners.

As seen in FIG. 1, stand 10 may include a second post 17 which can be joined to the first post by connector 16. Second post 17 is spaced horizontally or laterally with respect to first post 12. The lateral spacing of posts 12, 17 provide spacing between mount 19 and rest 13. It is envisioned that this spacing can be increased or reduced by changing or varying the length of brace 16. The connections between connector and first and second posts will preferably be removable and employ removable fasteners. Tray 15 can be secured to connector 16, or first and second posts 12,17 or any combination thereof. When tray 15 is secured to posts 12, 17 it acts as an additional brace between posts 12, 17. First and second posts 12, 17 may be made in one single piece or a plurality of pieces or sections. The pieces or sections will be capable of being secured together in an interlocking manner so they do not come apart. The pieces or sections once joined act as a single post or part. The sections can be readily assembled by the user with removable fasteners such as bolts or any other suitable removable fasteners. If desired, the sections or parts may be secured with permanent fasteners.

The openings in first and second posts 12,17 allow the user to secure housing 18 or support member 20 at a variety of different heights along the height or length of first and second posts 12,17.

Figure 3:
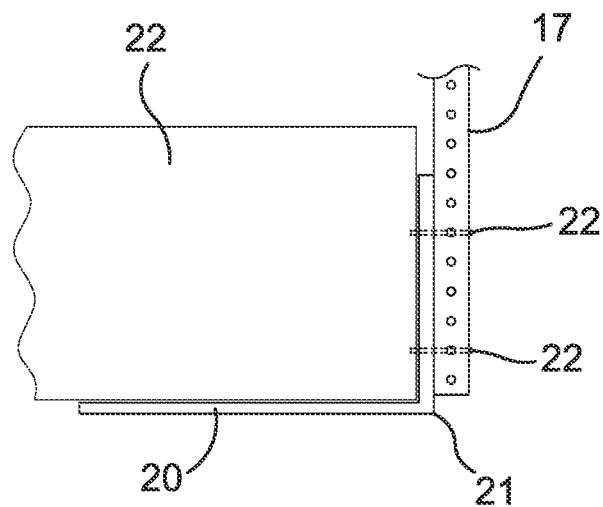
FIG. 3 is a side view of the support member engaging the mattress.
Figure 7:
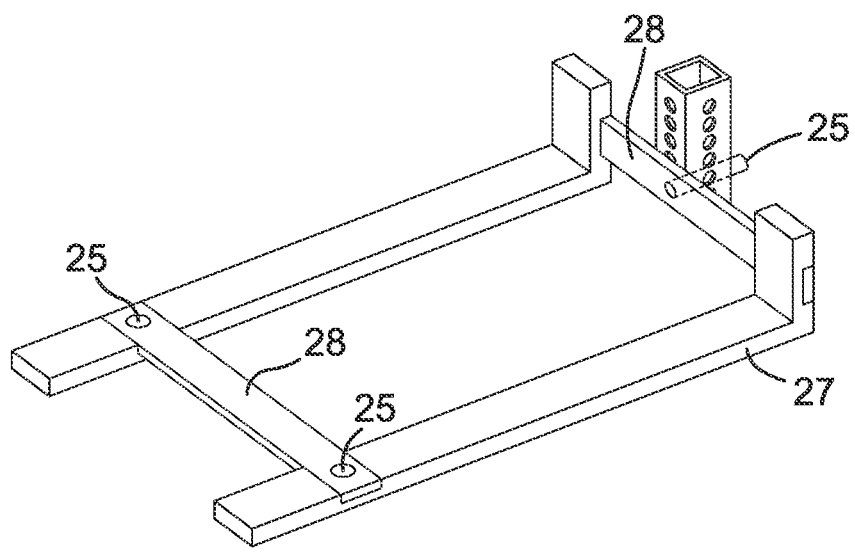
FIG. 7 is an elevation view of a pair of forks and a pair of fork cross braces secured to a post.
Figure 8:
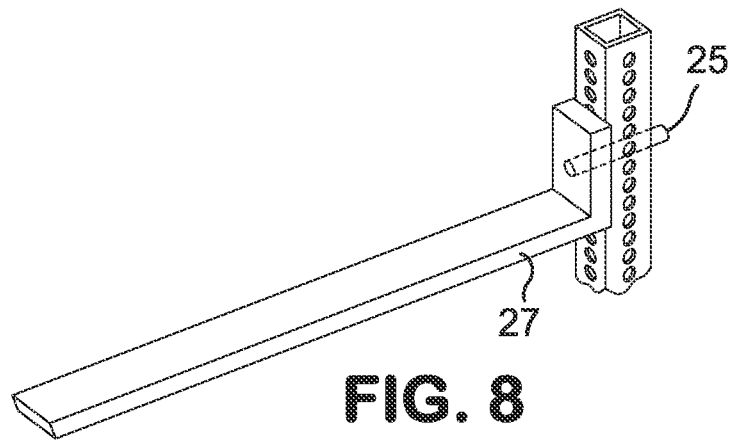
FIG. 8 is an elevation view of a fork secured to a post.
Figure 10:
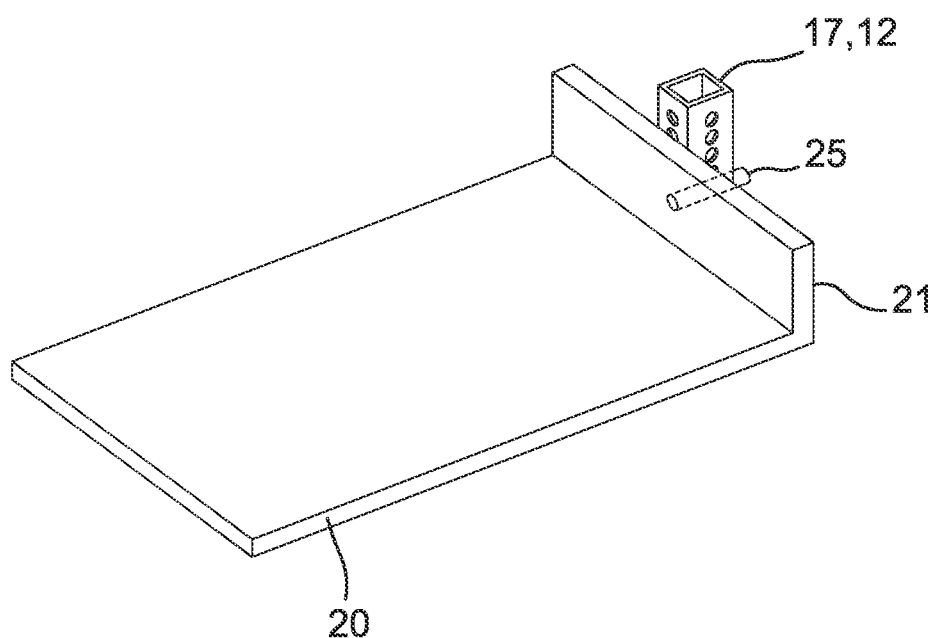
FIG. 10 is an elevation view of a support member secured to a post.

Support member 20 is a generally planar member with an upright face 21. The upright face 21 adds an additional element or surface to engage a part or portion of a bed. Support member 20 may be in the form of a plate like member as seen in FIGS. 1, 2 and 10 or employ separate elements similar to the forks on a forklift as seen in FIGS. 7 and 8. A pair of forks 27 as seen in FIG. 7 are secured together by a pair fork braces 28 by employing second fasteners 25. Second fasteners 25 are preferably recessed or flush with the surfaces they extend through. Forks 27 can be secured to posts 12, 17 with at least one fastener 25. FIG. 8 shows an alternative employing a single fork 27 as the support member where the single fork 27 is secured to post 12, 17 with at least one fastener 25. Support member 20 (when a plate like member) may be formed from a plurality of interconnected pieces to reduce volume for shipping and/or storage. This can be achieved in a manner similar to base member 11 as seen in FIGS. 5 and 6. As seen in FIG. 3, support member 20 will preferably include an upright face or flange 21. Upright face 21 provides additional support surface for engaging against a part of a bed such as mattress 22. When the support member is placed under mattress 22 the upright face 21 engages or abuts a surface of mattress 22.

Figure 9:
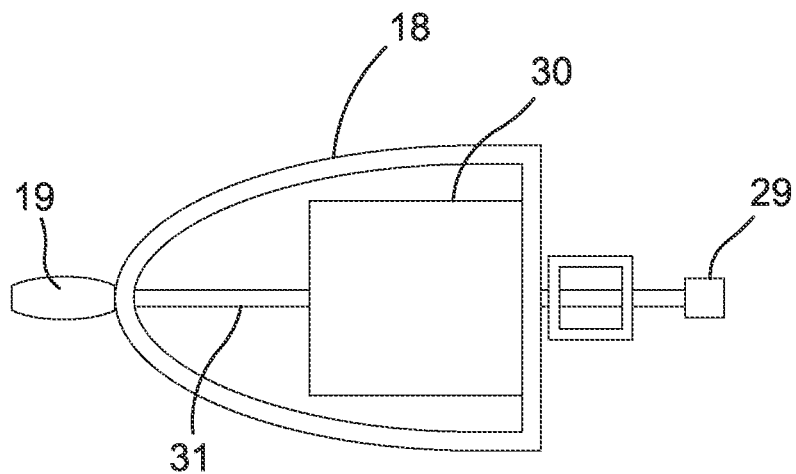
FIG. 9 is a top view of the housing secured to a post where the housing has a drive mechanism therein.

FIG. 9 shows housing 18 is secured to post 12, 17 by at least one quick release fastener 29. The surface opposite mount 19 directly engages post 12, 17. It is within the scope of the invention to employ alternative fasteners such as but not limited to threaded bolts or any other suitable removable fastener to secure housing 18 to post 12, 17. Housing 18 may be provided with protrusions that are received into the openings in post 12, 17 to prevent housing 18 from rotating or shifting with respect to post 12, 17. FIG. 1 shows an alternative way of mounting housing 18 on post 17. Housing 18 has extensions or elements that extend along the sides of post 17 with openings to receive first fasteners 22. Drive mechanism 30 is preferably removably mounted in housing 18. Preferably, the lower end of housing 18 is closed providing a mounting surface for drive mechanism 30. The drive mechanism 30 may alternatively provide rotary or vibratory motion or combinations thereof in addition or in combination with reciprocating motion. Drive mechanism 30 includes a drive shaft 31 extending through an opening in housing 18 and connected to mount 19.

Base 11 may be provided with structure(s) to hold weights or weighted items thereon. These structures are essentially weight holders. These weight holders may be similar to post holder 26. They can be located in a recess on the bottom surface of base 11 and extend through and above the top surface of base 11 providing a protruding member above the top surface of base 11 over which a weight(s) may be placed. The weights will typically have a hole or opening therethrough for receiving the protruding member of the weight holder. These weights may be ordinary barbell weights or any other weight suitable for the task. Base 11 may employ one ore more weight holders thereon or therethrough. The weight holders may be formed as a part of base 11 so as to be integral or one piece with base 11. Preferably, the weight holders will be separate from base 11 so as to be removable from base 11. It has also been considered that at least one weight may be placed over post holder 26 to help hold or secure base 11 in place.

It is understood that the present invention is not limited to the embodiments described above, but encompasses any and all of the embodiments within the scope of the appended claims.

The invention claimed is:

1. A stand for supporting an erotic device, the stand comprising:
   a base for supporting said stand;
   at least one vertical support member connected to said base, extending in a vertical manner from said base;
   an intermediate support member detachably connected to said at least one vertical support member; said intermediate support member being capable of being secured to said at least one vertical support member at various heights along said at least one vertical support member; said intermediate support member being vertically spaced from said base, wherein the intermediate support member is capable of being inserted under a mattress thereby providing additional support to said stand;
   a mount removably secured to said at least one vertical support member for securing an erotic device thereon; and
   an appendage support element connected to said at least one vertical support member, wherein said appendage support element extends transverse with respect to said at least one vertical support member and is vertically spaced from said mount.

2. The stand of claim 1, wherein the appendage support element and the mount are laterally spaced from each other.

3. The stand of claim 1, wherein the appendage support element can be attached to said stand at different positions along a vertical axis of said at least one vertical support member.

4. The stand of claim 1, wherein the mount can be attached to said stand at different positions along a vertical axis of said at least one vertical support member.

5. The stand of claim 1, wherein the intermediate support member is selected from the group consisting of a planar member or a stepped member.

6. The stand of claim 1, wherein the intermediate support member has an upright face extending from a surface thereon.

7. The stand of claim 1, including a housing capable of enclosing a drive mechanism; said housing is capable of being secured to said at least one vertical support member at a variety of different heights along said at least one vertical support member.

8. The stand of claim 1, including a drive mechanism in a housing, said housing being secured to said at least one vertical support member, said drive mechanism providing motion to said mount selected from the group consisting of reciprocating, rotating, vibrational, or combinations thereof.

9. A stand for supporting an erotic device, the stand comprising:
   a base for supporting said stand;
   at least one vertical support connected to said base, extending in a vertical manner from said base;
   an intermediate support removably connected to said at least one vertical support; said intermediate support being capable of being secured to said at least one vertical support at various heights along said at least one vertical support; said intermediate support being vertically spaced from said base, wherein the intermediate support is capable of being inserted under a mattress thereby providing additional support to said stand;
   a mount removably secured to said at least one vertical support for securing an erotic device thereon; and
   an appendage support connected to said at least one vertical support, said appendage support extends transverse with respect to said at least one vertical support; and
   wherein said appendage support is capable of being secured to said at least one vertical support at various heights along said at least one vertical support.

10. A stand for supporting an erotic device, the stand comprising:
    a base for supporting said stand;
    a first vertical support connected to said base, extending in a vertical manner from said base;
    a second vertical support connected to said first vertical support, said second vertical support being laterally spaced from said first vertical support;
    an intermediate support removably connected to said second vertical support; said intermediate support being capable of being secured to said second vertical support at various heights along said second vertical support; said intermediate support being vertically spaced from said base, wherein the intermediate support is capable of being inserted under a mattress thereby providing additional support to said stand; and
    a mount removably secured to said second vertical support for securing an erotic device thereon.

11. A stand for supporting an erotic device, the stand comprising:
    a base for supporting said stand;
    at least one vertical support connected to said base, extending in a vertical manner from said base;
    an intermediate support removably connected to said at least one vertical support; said intermediate support being capable of being secured to said at least one vertical support at various heights along said at least one vertical support; said intermediate support being vertically spaced from said base, wherein the intermediate support is capable of being inserted under a mattress thereby providing additional support to said stand;
    a mount removably secured to said at least one vertical support for securing an erotic device thereon; and
    an appendage support connected to said at least one vertical support, said appendage support extends transverse with respect to said at least one vertical support; and
    wherein said at least one vertical support is made of a plurality of interconnected tubular elements secured together with removable fasteners.

* * * * *